(12) United States Patent
Sun

(10) Patent No.: US 10,592,004 B1
(45) Date of Patent: Mar. 17, 2020

(54) DISPLAY ASSEMBLIES DISPOSED INSIDE MECHANICAL KEYS IN A MECHANICAL KEYBOARD

(71) Applicant: Jen-Wen Sun, New Taipei (TW)

(72) Inventor: Jen-Wen Sun, New Taipei (TW)

(*) Notice: Subject to any disclaimer, the term of this patent is extended or adjusted under 35 U.S.C. 154(b) by 0 days.

(21) Appl. No.: 16/129,816

(22) Filed: Sep. 13, 2018

(51) Int. Cl.
| | |
|---|---|
| *G06F 3/023* | (2006.01) |
| *G06F 3/02* | (2006.01) |
| *G06F 3/041* | (2006.01) |
| *H01H 13/83* | (2006.01) |
| *H01H 13/705* | (2006.01) |

(52) U.S. Cl.
CPC ........... *G06F 3/0238* (2013.01); *H01H 13/83* (2013.01); *G06F 3/0202* (2013.01); *G06F 3/0412* (2013.01); *G06F 2203/04809* (2013.01); *H01H 13/705* (2013.01); *H01H 2215/05* (2013.01)

(58) Field of Classification Search
CPC .... G06F 3/0238; G06F 3/0202; G06F 3/0412; G06F 3/02; G06F 2203/04809; H01H 13/83; H01H 13/705; H01H 2215/05
See application file for complete search history.

(56) References Cited

U.S. PATENT DOCUMENTS

| | | | | |
|---|---|---|---|---|
| 4,987,279 A * | 1/1991 | Hirose | ................... | H01H 9/181 200/312 |
| 5,278,362 A * | 1/1994 | Ohashi | ................... | H01H 9/181 200/314 |
| 7,060,922 B2 * | 6/2006 | Hoehne | ................ | H01H 13/023 200/310 |
| 7,943,875 B2 * | 5/2011 | Chu | ........................ | H01H 9/181 200/293 |
| 8,378,246 B2 * | 2/2013 | Chu | ........................ | H01H 9/181 200/520 |
| 9,153,395 B2 * | 10/2015 | Chu | ........................ | H01H 9/181 |
| D753,069 S * | 4/2016 | Ura | .............................. | D13/171 |
| 9,384,917 B2 * | 7/2016 | Sugiyama | ............ | H01H 13/023 |
| 2007/0065215 A1* | 3/2007 | Brown | .................. | G06F 3/0238 400/490 |
| 2009/0107817 A1* | 4/2009 | Onuki | .................. | H01H 13/023 200/314 |
| 2010/0163386 A1* | 7/2010 | Sun | ........................ | H01H 9/181 200/341 |
| 2010/0213038 A1* | 8/2010 | Sun | .......................... | G09F 9/00 200/61.1 |

(Continued)

*Primary Examiner* — Darlene M Ritchie
(74) *Attorney, Agent, or Firm* — Leong C. Lei

(57) ABSTRACT

The mechanical keyboard includes a base plate having multiple through openings, a circuit board disposed to a side of the base plate, multiple mechanical keys disposed at the through openings and connected to the circuit board. Each mechanical key includes a keyswitch, a keycap, and at least a transparent piece. The keyswitch is connected to the circuit board. The keycap is mounted on the keyswitch, and the transparent piece is configured to a top side of the keycap. There are multiple display assemblies, each disposed inside a mechanical key between the keycap and the keyswitch. Each display assembly is data-linked to the circuit board through a signal transmission element. The display assemblies may be installed on conventional mechanical keys and may be viewed from different angles. The mechanical keyboard also has longer operation life.

8 Claims, 13 Drawing Sheets

(56) References Cited

U.S. PATENT DOCUMENTS

| | | | |
|---|---|---|---|
| 2011/0127149 A1* | 6/2011 | Sun | H01H 13/83 200/314 |
| 2013/0026017 A1* | 1/2013 | Verd Martinez | H01H 9/161 200/307 |
| 2015/0083564 A1* | 3/2015 | Verd Martinez | H01H 13/83 200/5 A |
| 2015/0293605 A1* | 10/2015 | Deghdak | G06F 3/0219 345/172 |
| 2018/0068811 A1* | 3/2018 | Ligtenberg | H01H 13/86 |
| 2019/0102969 A1* | 4/2019 | Lapalme | G07F 17/3209 |

* cited by examiner

DISPLAY ASSEMBLIES DISPOSED INSIDE MECHANICAL KEYS IN A MECHANICAL KEYBOARD

BACKGROUND OF THE INVENTION (a) Technical Field of the Invention

The present invention is generally related to mechanical keyboards, and more particular to a mechanical keyboard where each key has a display module.

(b) Description of the Prior Art

R.O.C. Taiwan Patent No. M400080 discloses a teaching that a LED display is placed between the keycap and circuit board and the LED display is fixed to the circuit board. The LED display therefore does not move with the keycap. When the keycap is not depressed, the LED display is visible only at certain angle, compromising its applicability. The operation life is also limited, causing a higher usage cost. In addition, such a mechanical key requires a different modular design and is difficult to integrate with existing mechanical key. The design, manufacturing, and assembly are all more complex and inconvenient.

As such, there are teachings that the LED display is configured with the keycap so that it will move up and down with the keycap. This design also requires a different modular design and is difficult to integrate with existing mechanical key. There is also a different touch feeling.

SUMMARY OF THE INVENTION

A major objective of the present invention is to provide a mechanical keyboard where display modules are configured on the keycaps so that they will move along with the keycaps and they are as such visible to a user from different angles. The display modules may be installed in ordinary mechanical keys, achieving simpler manufacturing. Signal transmission elements run through the various components and connect to a bottom side of a circuit board. The signal transmission elements therefore are less prone to wear and damage, enhancing their operation lives.

To achieve the objective, the mechanical keyboard includes a base plate having multiple through openings, a circuit board disposed to a side of the base plate, multiple mechanical keys disposed at the through openings and connected to the circuit board. Each mechanical key includes a keyswitch, a keycap, and at least a transparent piece. The keyswitch is connected to the circuit board through a through opening, the keycap is mounted on the keyswitch, and the transparent piece is configured to a top side of the keycap. There are multiple display assemblies, each disposed inside a mechanical key. Each display assembly includes a display module, a frame, and a base. The frame is fixed in the keycap of the mechanical key. The display module is confined in the frame and disposed to a side of the transparent piece. The base is disposed to a side of the display module so that the display module is joined to the keyswitch through the base. There are multiple signal transmission elements, each having an end connected to a display assembly, and another end extended through the base plate and the circuit board and connected to a side of the circuit board away from the base plate.

Through the above structure, a depressed keycap engages the base and signal is transmitted to the circuit board. Each display module is fixed in a keycap through the engagement between a frame and a base. As each keycap is joined to the keyswitch through the base, the display module moves up and down along with the keycap. Then, regardless whether a keycap is depressed or not, each display module is besides the transparent piece at all times, and a user may always see the content on the display module. The display module may show various content provided by the circuit board. The signal transmission element runs around the base and the circuit board, and connects to a bottom side of the circuit board. When the keycap is depressed and the display module moves as well, the signal transmission element is bent and pressure is evenly distributed across the entire signal transmission element. The signal transmission element is as such less prone to wear and damage, and has a longer operation life. As each display assembly is directly housed in an ordinary mechanical key without designing a new mechanical key for the display assembly, the mechanical keyboard is easier to assembly and manufacture. The present invention as such resolves the problem of conventional mechanical keys that display screens are limited to certain viewing angle, operation life is shorter, and a new design is required.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
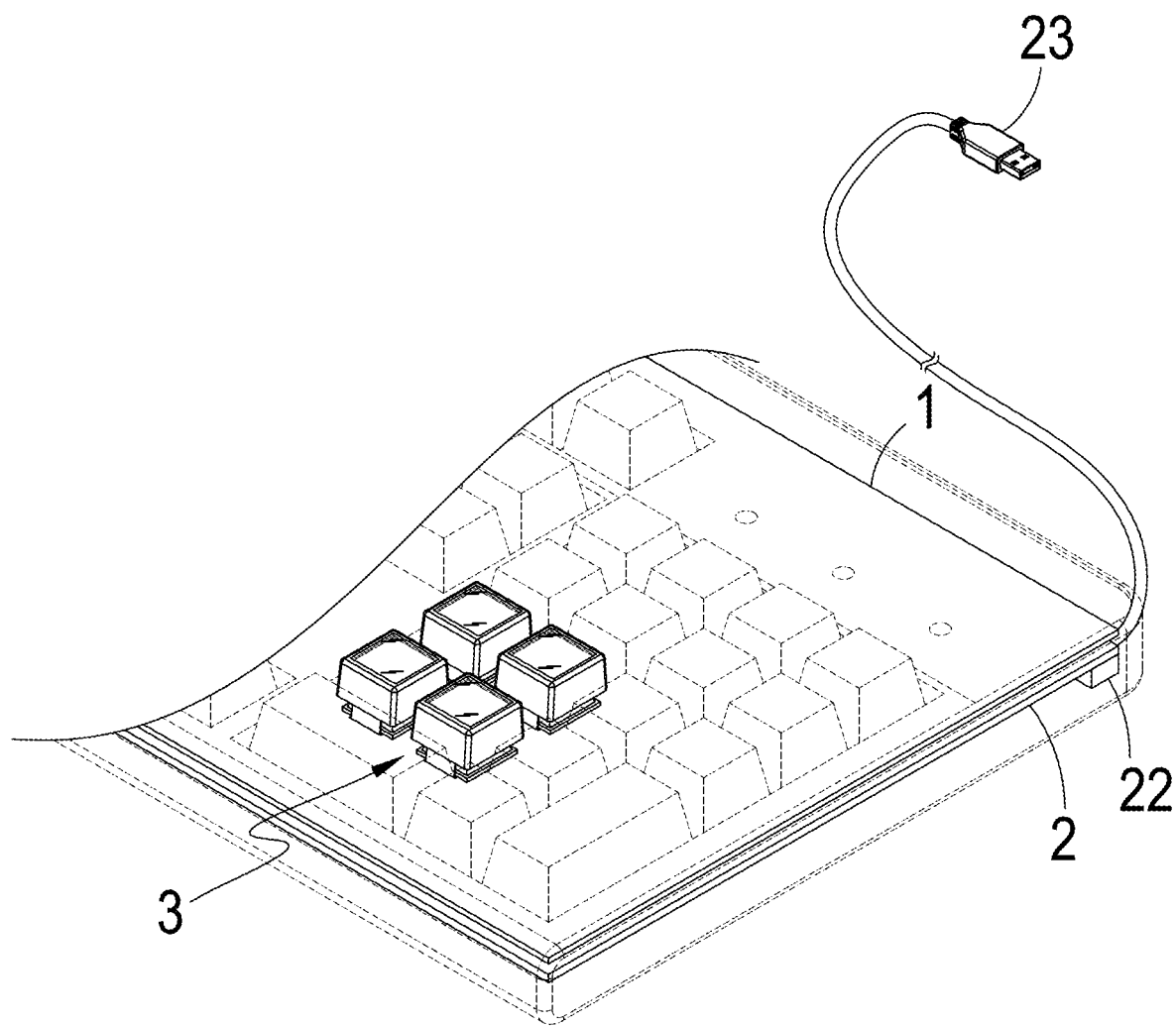
FIG. 1 is a perspective diagram showing a mechanical keyboard according to first embodiment of the present invention.
Figure 2:
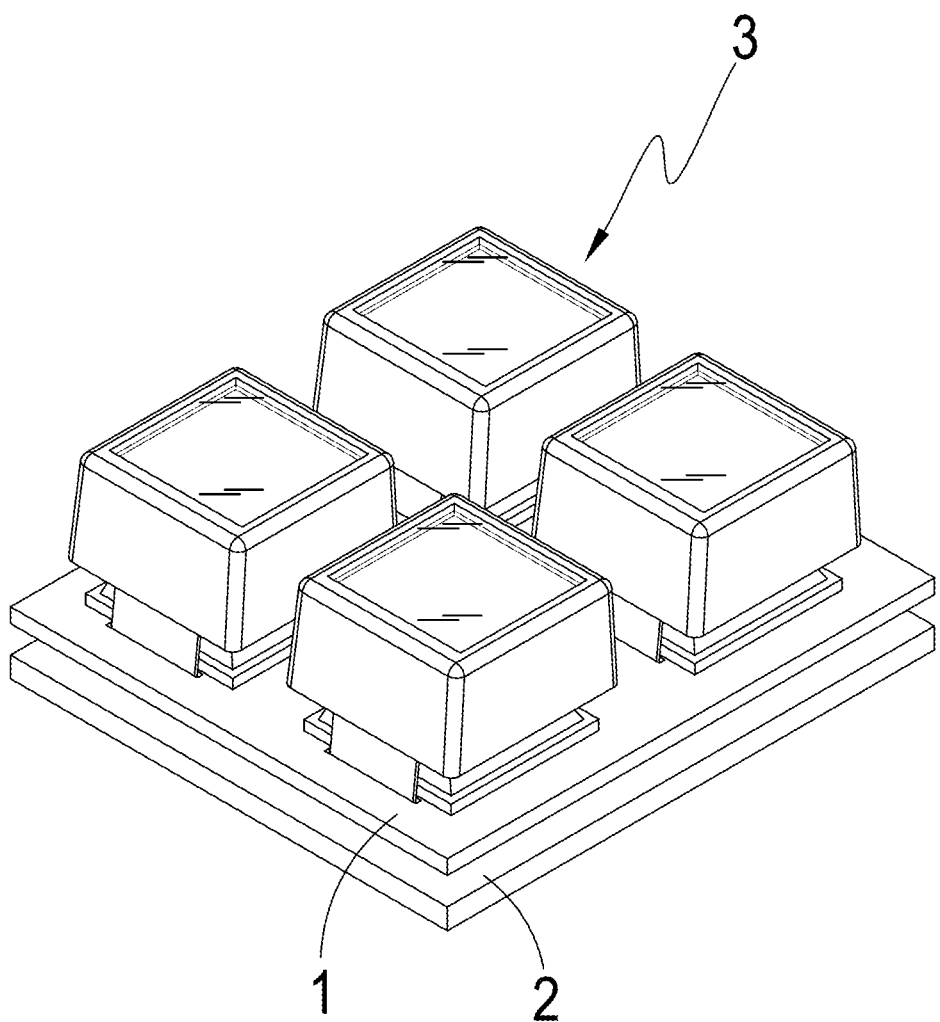
FIG. 2 is a perspective diagram showing a number of keys from the mechanical keyboard of FIG. 1.
Figure 3:
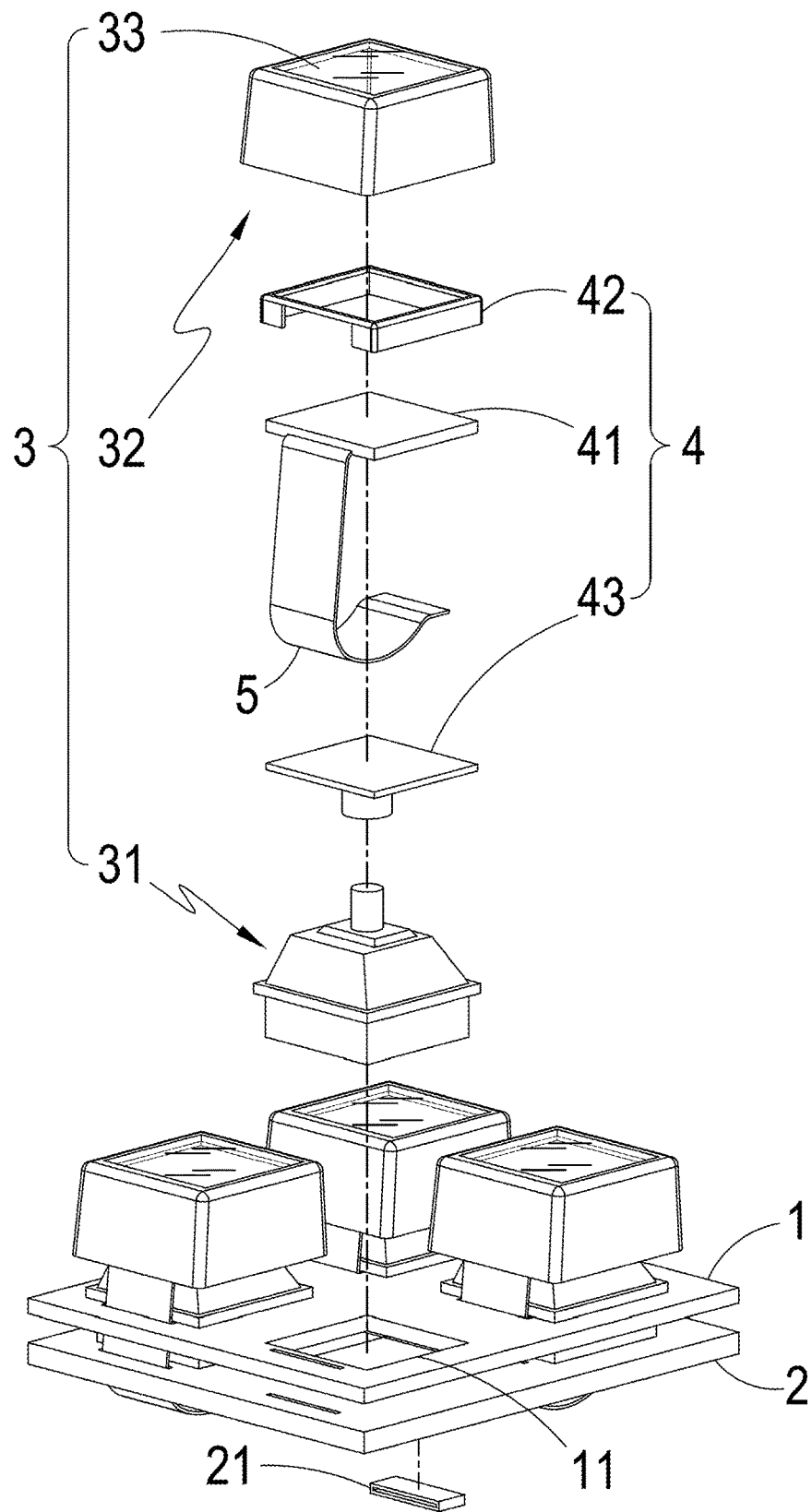
FIG. 3 is a perspective breakdown diagram showing a number of keys from the mechanical keyboard of FIG. 1.
Figure 4:
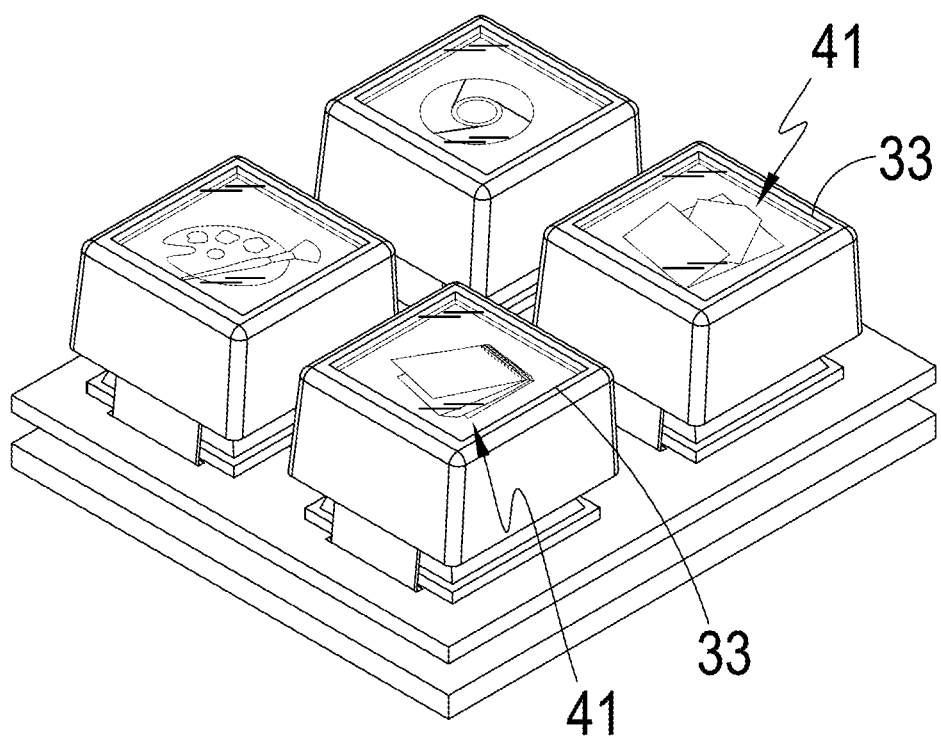
FIG. 4 is a perspective breakdown diagram showing a number of keys from the mechanical keyboard of FIG. 1.
Figure 5:
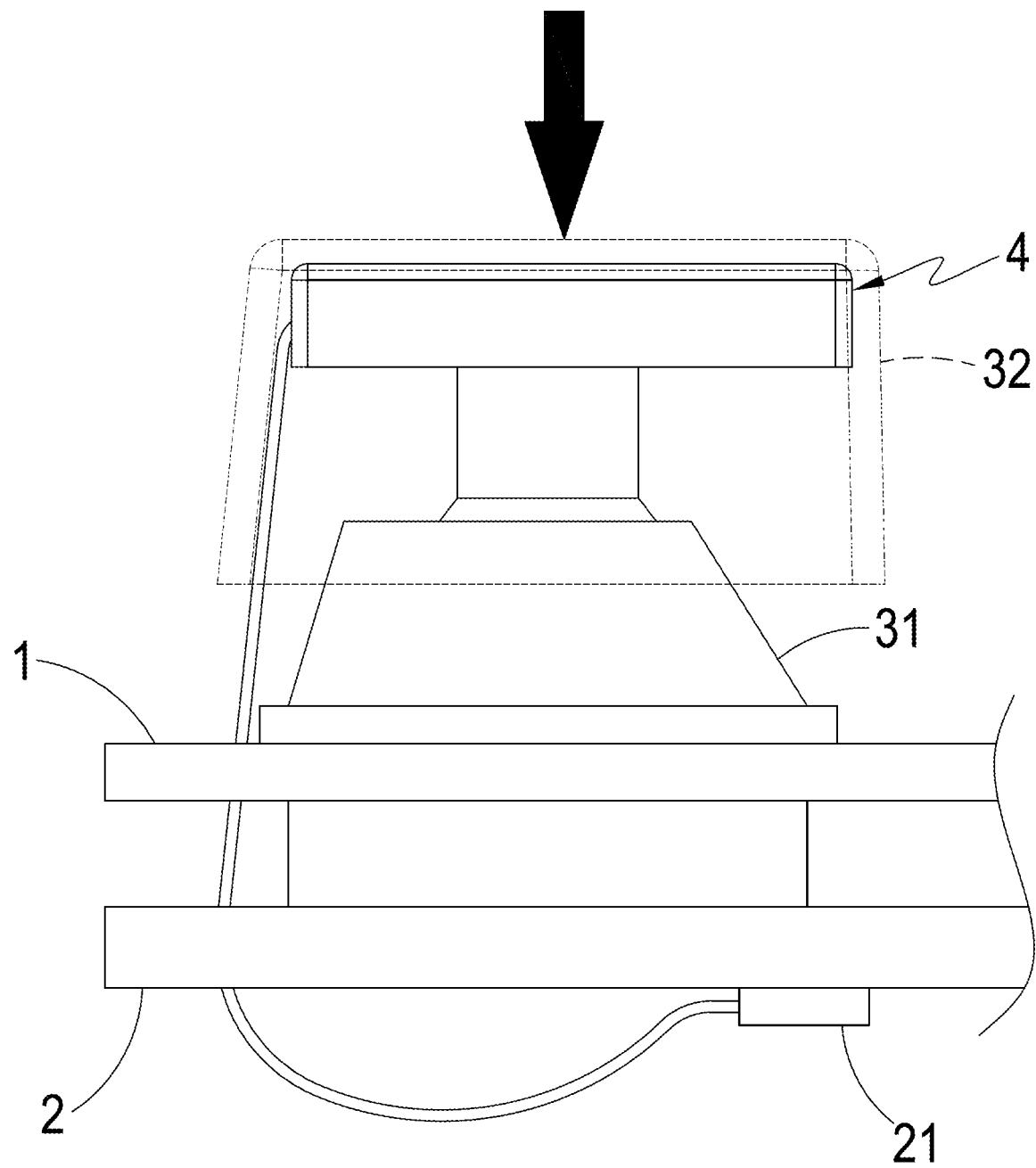
FIG. 5 is a schematic side-view diagram showing a key from the mechanical keyboard of FIG. 1 before being depressed.
Figure 6:
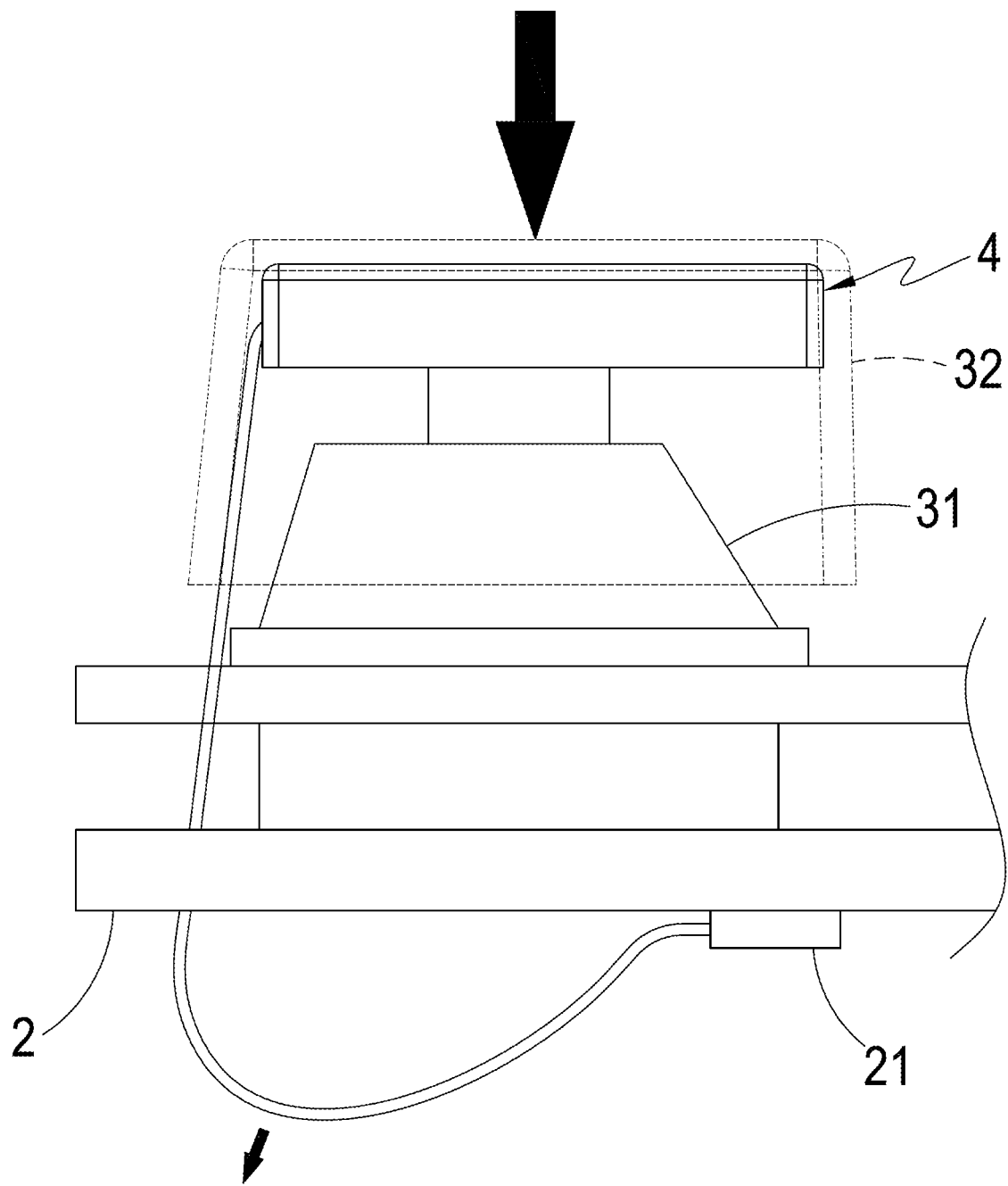
FIG. 6 is a schematic side-view diagram showing the key of FIG. 5 being depressed.
Figure 7:
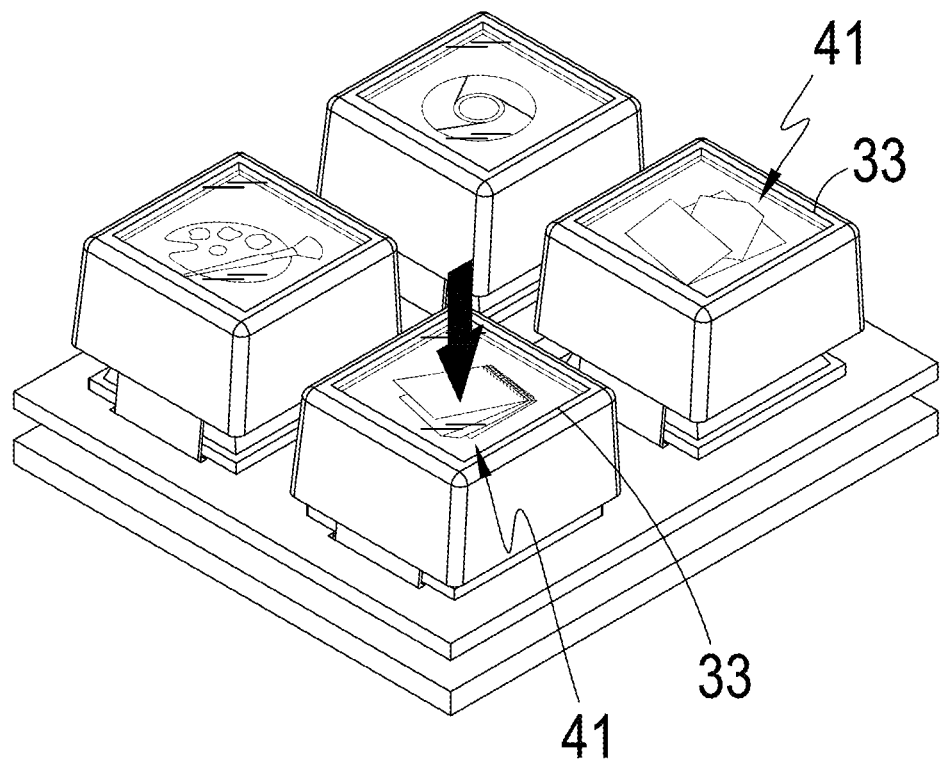
FIG. 7 is a perspective diagram showing a key of FIG. 4 being depressed.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims As shown in FIGS. 1 to 3, a mechanical keyboard according to a first embodiment of the present includes a base plate 1, a circuit board 2, multiple mechanical keys 3, multiple display assemblies 4, and multiple signal transmission elements 5. The base plate 1 has multiple through openings 11. The circuit board 2 is disposed to a side of the base plate 1. Each mechanical key 3 is disposed at an opening 11 and connected to the circuit board 2 through the opening 11. Each display assembly 4 is disposed inside a mechanical key 3. Each signal transmission element 5 connects a display assembly 4 to the circuit board 2.

Each mechanical key 3 includes a keyswitch 31, a keycap 32, and at least a transparent piece 33. The keyswitch 31 is an ordinary mechanical switch connected to the circuit board 2 through an opening 11. The keycap 32 is mounted on the keyswitch 31 through a display assembly 4. The transparent piece 33 is configured to a top side of the keycap 32. It is also possible that the entire keycap 32 is the transparent piece 33.

Each display assembly 4 includes a display module 41, a frame 42, and a base 43. The frame 42 is housed in a keycap 32 of a mechanical key 3. The display module 41 is mounted in the frame 42 and both are disposed to a side of the transparent piece 33 of the mechanical key 3. The display module 41 may be based on LED or other means so as to present a content to a user through the transparent piece 33. The base 42 is disposed to a side of the display module 41. The display module 41 is positioned between the frame 42 and the base 43, and the base 43 is joined to the keyswitch 31 of the mechanical key 3. As such, the keycap 32 is joined to the keyswitch 31 through the display assembly 4.

Each signal transmission element 5 is a flexible printed circuit (FPC) board or a flat flex cable (FFC), but is not limited as such. Each signal transmission element 5 has an end connected to the display module 41 of a display assembly 4, and another end running through the frame 42, the base 43, the base plate 1 and the circuit board 2 and connected to a side of the circuit board 2 away from the base plate 1. The circuit board 2 has multiple connectors 21, each connected to a signal transmission element 5.

In the present embodiment, the circuit board 2 further has an external processor 22 and an external connector 23 for data-linking the circuit board 2 with a computer host for two-way signal transmission. The external connector 23 may be a universal serial bus (USB) connector, a DIN connector, or a PS/2 connector, but is not limited as such. It is an USB connector in the present embodiment.

As shown in FIGS. 1 to 7, in the first embodiment of the present invention, the mechanical keyboard is connected to a computer host through the external connector 23. The external processor 22 exchanges signal between the circuit board 2 and the computer host. When a keycap 32 is depressed, the keyswitch 31 is engaged and a corresponding signal is transmitted to the circuit board 2 and the computer host. The mechanical key 3 is supported by the base plate 1 so that it does not shake easily. When a keycap 32 is depressed, the display assembly 4 moves up and down along with the keycap 32. As the display module 41 is fixed in the keycap 32 through the frame 42 and the base 43. The display module 41 therefore also moves up and down along with the keycap 32, meaning that the display module 41 is always adjacent to the transparent piece 33. A user therefore easily views the content shown by the display module 41 through the transparent piece 33, whether the keycap 32 is depressed or not. The display module 41 is data-linked with the circuit board 2 through the signal transmission element 5. The displayed content as such may be controlled and modified by the computer host through the circuit board 2. For example, icons corresponding to the applications such as notepad, browser, paint brush, and email. Through this control and modification function to the display modules 41, the user may view the content from the display modules 41 at any angle, greatly enhancing the convenience of the mechanical keyboard. In addition, each display assembly 4 is configured in an ordinary mechanical key 3. There is no need to design different mechanical keys 3 for the display assemblies 4. The mechanical keyboard is therefore more convenient both in its assembly and manufacturing.

When a keycap 32 is depressed and the corresponding display module 41 is moved along, the flexible circuit board 2 is compressed. Since the signal transmission element 5's two ends are respectively connected to the display module 41 and a connector 21 on a side of the circuit board 2 away from the base plate 1, the signal transmission element 5 manifests a U-like shape and the compression pressure is distributed to the entire signal transmission element 5. The signal transmission element 5 as such would not be easily broken, thereby enhancing its operation life and cost of ownership.

Figure 8:
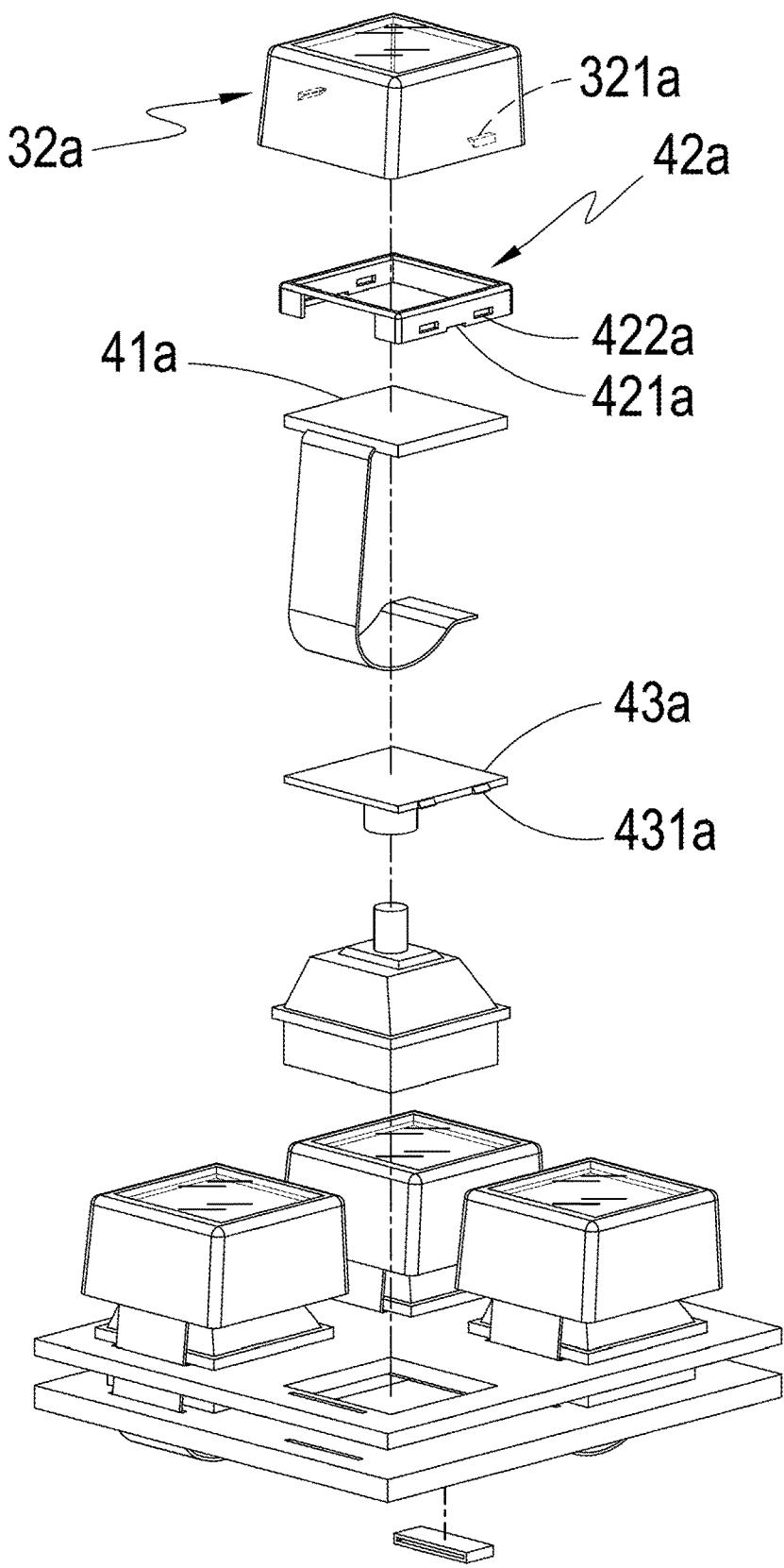
FIG. 8 is a perspective breakdown diagram showing a mechanical keyboard according to a second embodiment of the present invention.
Figure 9:
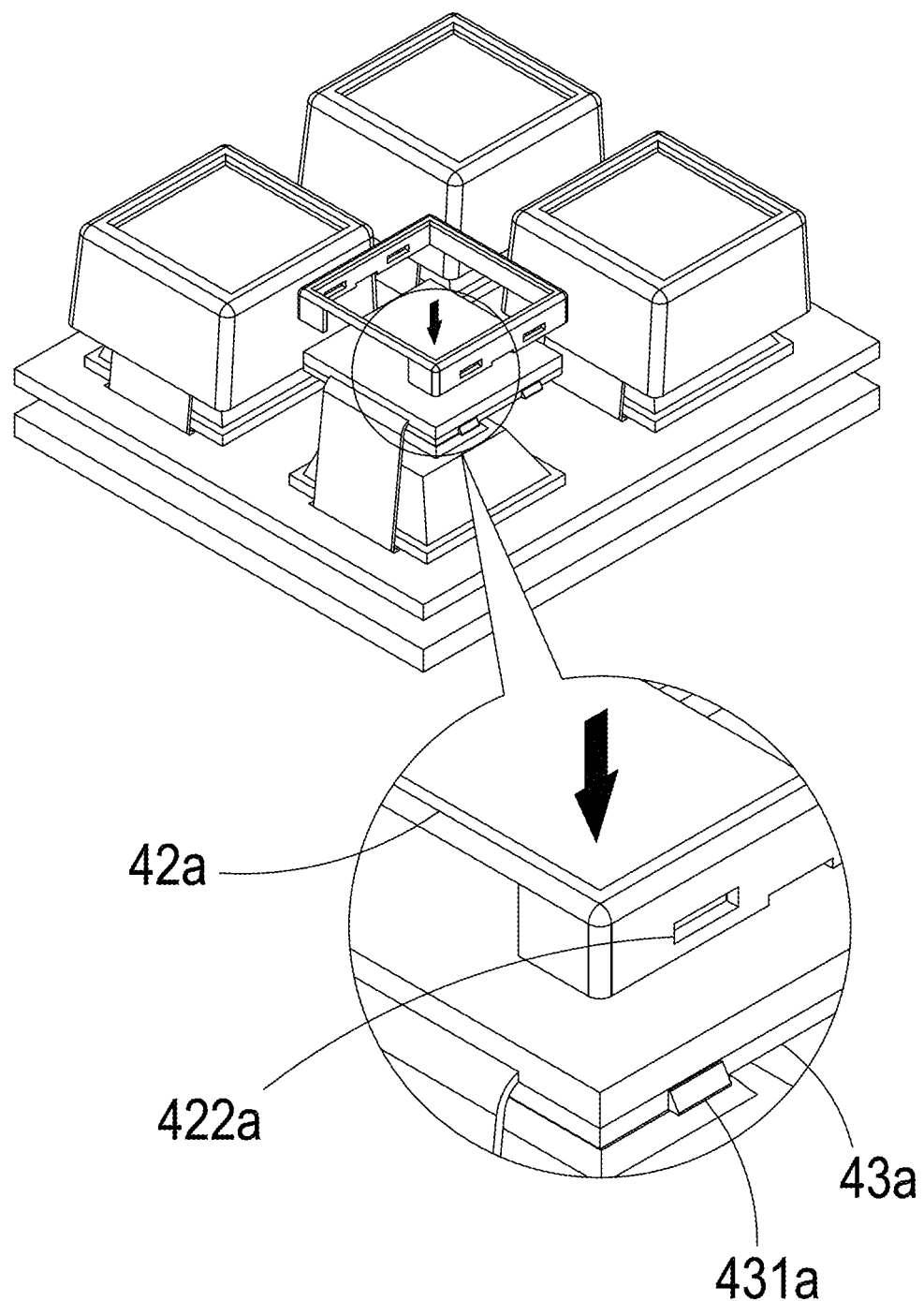
FIG. 9 is a perspective diagram showing the engagement between a display assembly's frame of the mechanical keyboard of FIG. 8.
Figure 10:
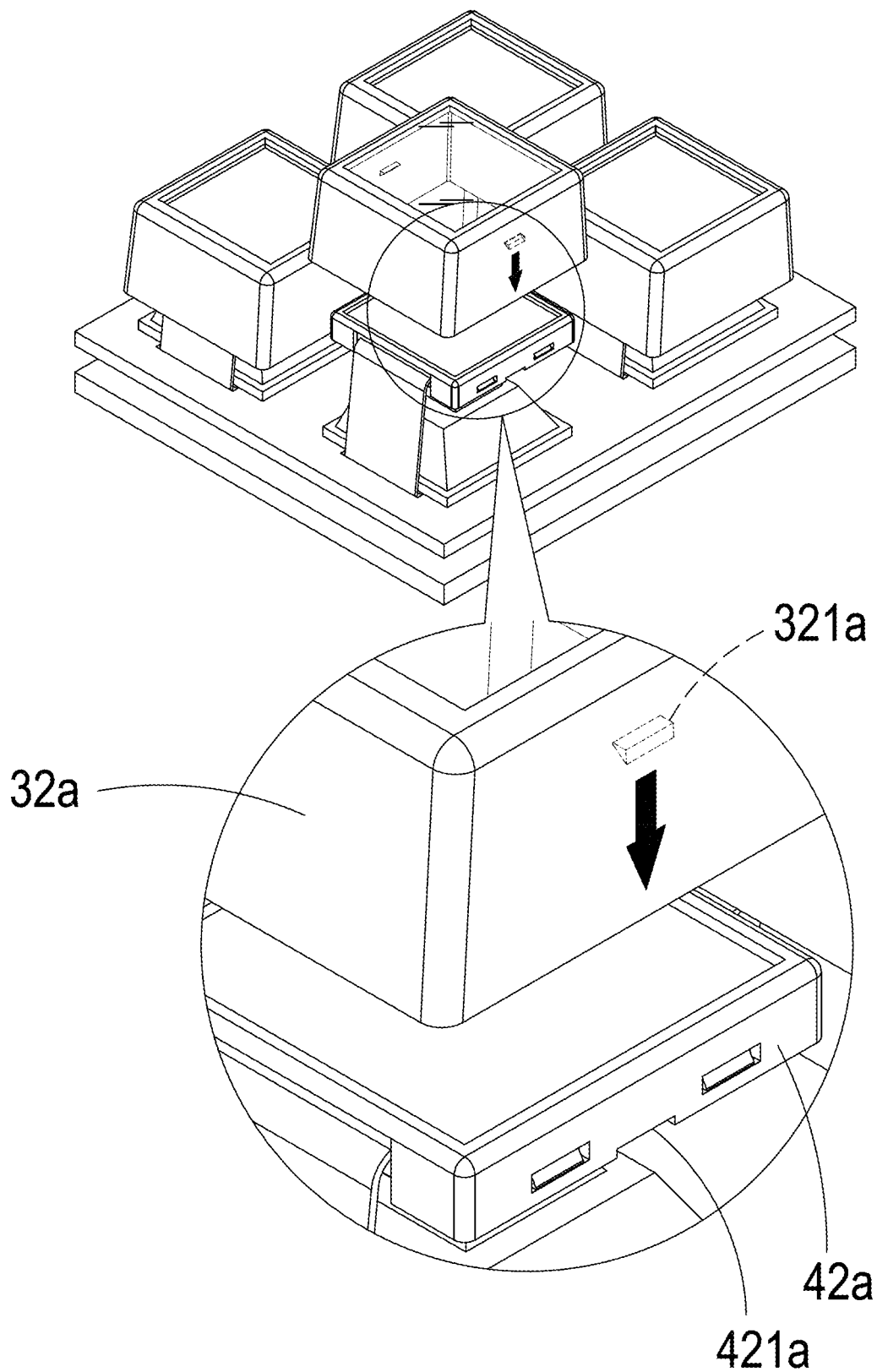
FIG. 10 is a perspective diagram showing the engagement between a keycap and a display assembly's frame of the mechanical keyboard of FIG. 8.

As shown in FIGS. 8 to 10, a second embodiment of the present invention is similar to the previous embodiment except that each frame 42a has a number of notches 421a along bottom edges and a number of slots 422a on circumferential walls of the frame 42a. Each keycap 32a has protrusion 321a on inner walls, each corresponding to a notch 421a. On the other hand, each base 43a has a number of blocks 431a along its circumference, each corresponding to a slot 422a. Through the engagement between the notches 421a and the protrusions 321a, each frame 42a is more reliably positioned in a keycap 32a. Similarly, through the engagement between the slots 422a and the blocks 431a, each base 43a, and therefore each display module 41a, is more reliably coupled to a frame 42a.

Figure 11:
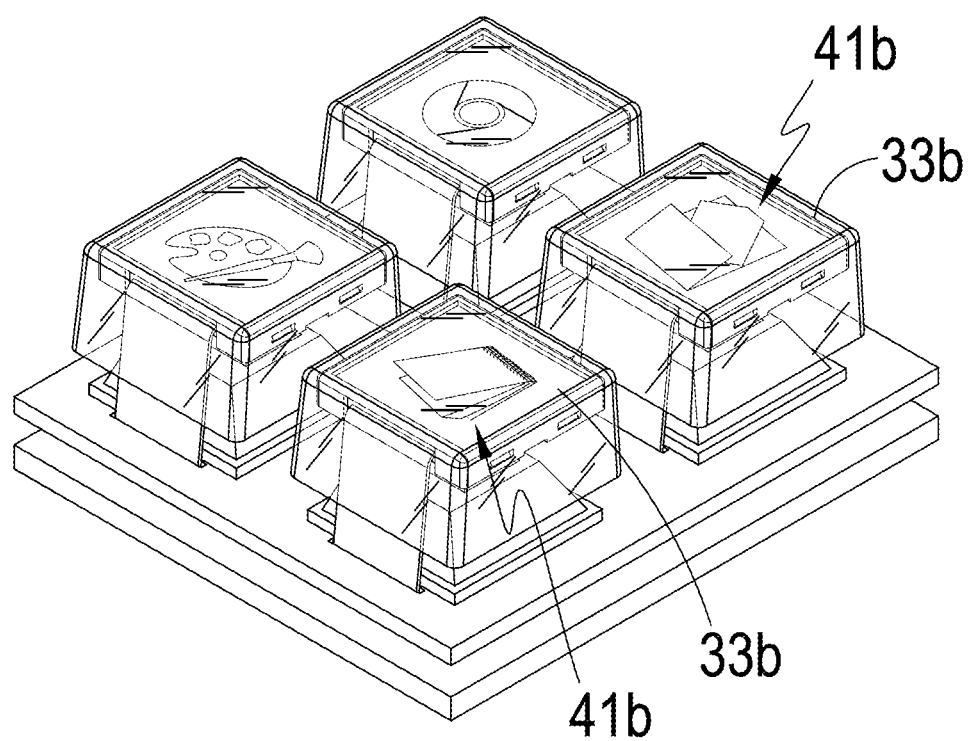
FIG. 11 is a perspective diagram showing a mechanical keyboard according to third embodiment of the present invention.

FIG. 11 shows a third embodiment of the present invention. As illustrated, the present embodiment is similar to the previous embodiments except that each keycap is the transparent piece 33b itself In other words, the transparent pieces 33b may have various embodiments as long as it may allow a user to view the display modules 41b clearly and conveniently.

Figure 12:
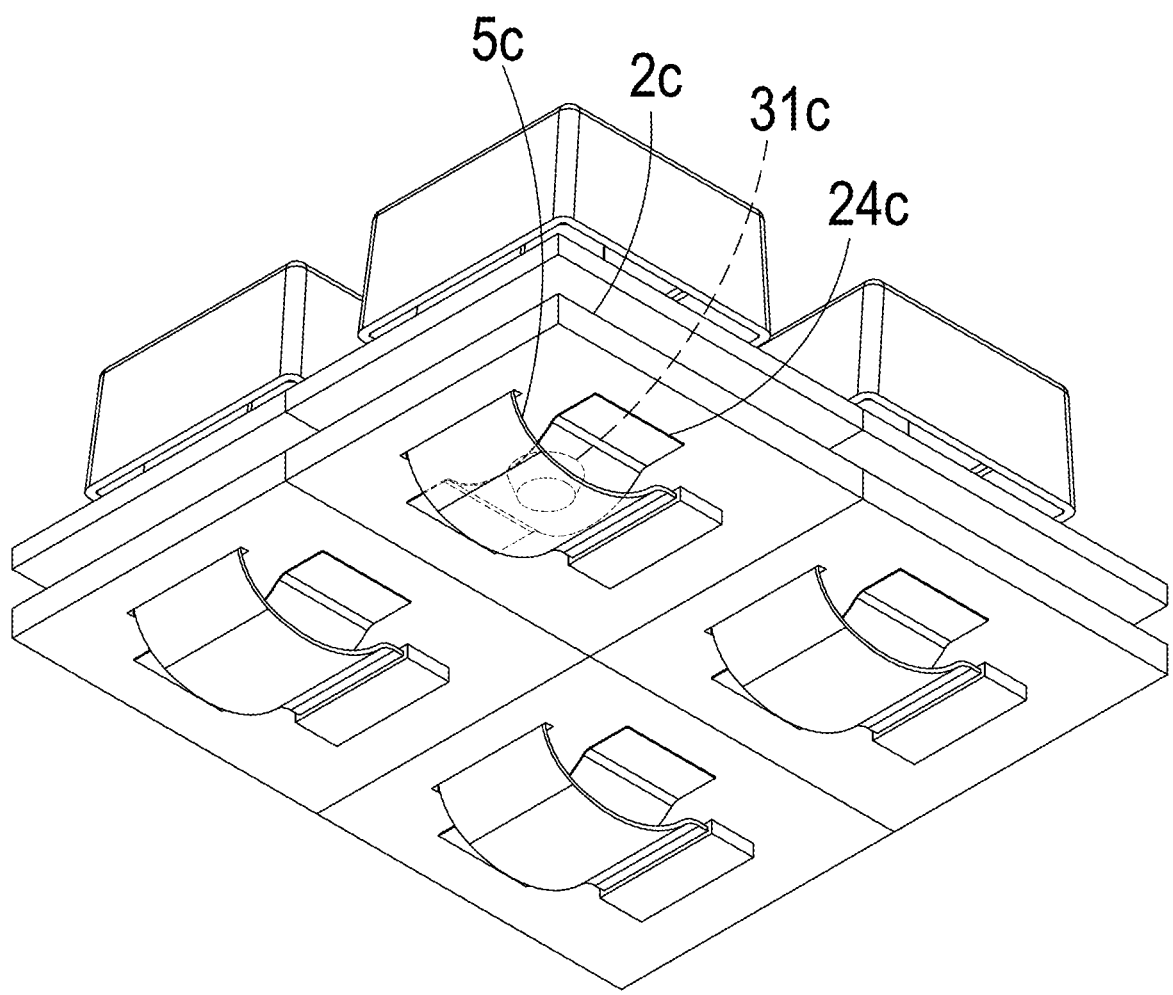
FIG. 12 is a perspective diagram showing a mechanical keyboard according to fourth embodiment of the present invention.

FIG. 12 shows a fourth embodiment of the present invention. As illustrated, the present embodiment is similar to the previous embodiments except that the circuit board 2c further includes multiple protection elements 24c, each positioned between a keyswitch 31c and a corresponding signal transmission element 5c. As the keyswitches 31c are mounted on the circuit board 2c, they will partially run through the circuit board 2c and may contact with the signal transmission elements 5c, causing various interference and damage problems. The protection elements 24c prevents the keyswitches 31c and the signal transmission elements 5c from contacting each other, thereby enhancing the safety of the mechanical keyboard.

Figure 13:
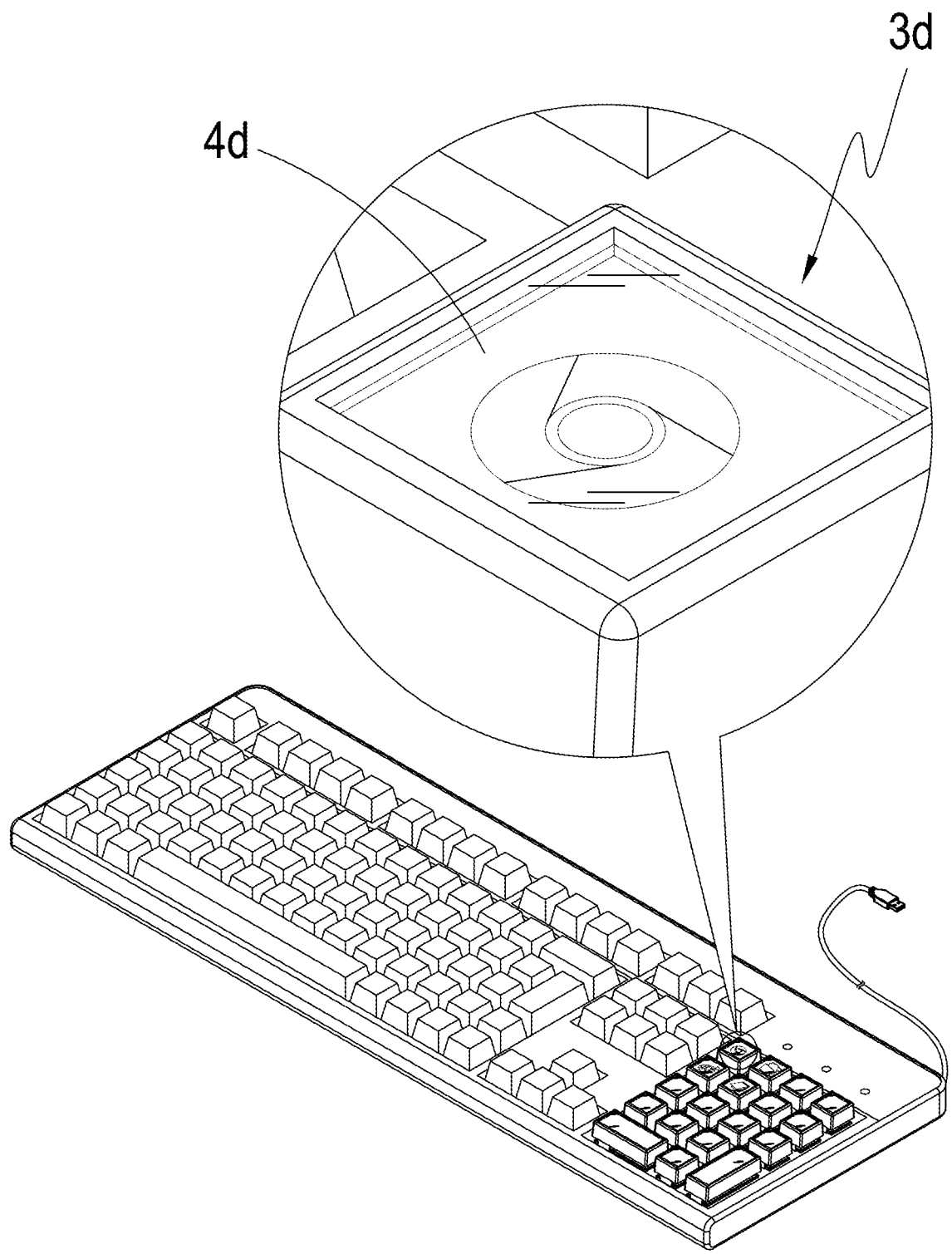
FIG. 13 is a perspective diagram showing a mechanical keyboard according to fifth embodiment of the present invention.

FIG. 13 shows a fifth embodiment of the present invention. As illustrated, the present embodiment is similar to the previous embodiments except that the kays on the numeric keypad are all mechanical keys 3d with display assemblies 4d. This embodiment demonstrates that the present invention does not limit how many keys on the mechanical keyboard are the mechanical keys 3d of the present invention. It is possible that all or some of the keys are the mechanical keys 3d with display assembly 4d.

Therefore, the mechanical keyboard of the present invention has the following advantages.

Firstly, a display assembly 4 is disposed between a keyswitch 31 and a keycap 32 so that a user may view the display module 41 from different angles, enhancing the applicability of the present invention.

Secondly, the display assembly 4 may be configured within an ordinary mechanical keys 3. There is no need to design a different key for housing display assembly 4, thereby achieving more convenient manufacturing.

Thirdly, through the connection by signal transmission elements 5, the mechanical keyboard has enhanced operation life and reduced cost.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A mechanical keyboard, comprising:

a base plate having a plurality of through openings;

a circuit board disposed to a side of the base plate;

a plurality of mechanical keys, each disposed at a through opening and connected to the circuit board through the opening, where each mechanical key comprises a keyswitch, a keycap, and at least a transparent piece, the keyswitch is connected to the circuit board through a through opening, the keycap is mounted on the keyswitch, and the transparent piece is configured to a top side of the keycap;

a plurality of display assemblies, each disposed inside a mechanical key between the keycap and the keyswitch, where each display assembly comprises a display module, a frame, and a base, the frame is fixed in the keycap of the mechanical key so that the display assembly moves along with the keycap through the frame, the display module is confined in the frame and disposed to a side of the transparent piece of the mechanical key, the base is disposed to a side of the display module so that the display module is joined to the keyswitch through the base; and a plurality of signal transmission elements, each having an end connected to a display assembly and another end extended through the base plate and the circuit board and connected to a side of the circuit board away from the base plate, so that the display assembly is data-linked with the circuit board through the signal transmission element;

wherein each frame has at least a notch along a bottom edge of the frame, and each keycap has at least a protrusion on an inner wall for engaging a corresponding notch of a frame so as to fix the frame inside the keycap.

2. The mechanical keyboard according to claim 1, wherein each signal transmission element has an end connected to the display module of the display assembly, and another end extended through the frame, the base, the base plate, and the circuit board and connected to a side of the circuit board away from the base plate.

3. The mechanical keyboard according to claim 1, wherein the circuit board has a plurality of connectors, each connected to a signal transmission element.

4. The mechanical keyboard according to claim 1, wherein the circuit board has an external processor for data-linking the circuit board with a computer host.

5. The mechanical keyboard according to claim 4, wherein the circuit board further has an external connector for data-linking the circuit board with a computer host.

6. The mechanical keyboard according to claim 5, wherein the external connector is a universal serial bus (USB) connector, a DIN connector, or a PS/2 connector.

7. The mechanical keyboard according to claim 1, wherein each frame has at least a slot on a circumferential wall of the frame.

8. The mechanical keyboard according to claim 7, wherein each base has at least a block along the base's circumference for engaging a corresponding slot of a frame so as to couple the frame and the base together.

* * * * *